United States Patent [19]

Harris

[11] 4,240,250
[45] Dec. 23, 1980

[54] NOISE REDUCING AIR INLET FOR GAS TURBINE ENGINES

[75] Inventor: Alfred W. Harris, Bellevue, Wash.

[73] Assignee: The Boeing Company, Seattle, Wash.

[21] Appl. No.: 864,665

[22] Filed: Dec. 27, 1977

[51] Int. Cl.³ .................. F02C 7/045; F02C 7/047
[52] U.S. Cl. .................... 60/39.09 D; 415/119
[58] Field of Search ....... 60/39.09 D, 226 R, 39.09 P, 60/269; 415/119; 137/15.1, 15.2; 181/214; 244/53 B

[56] References Cited

U.S. PATENT DOCUMENTS

| 2,528,635 | 11/1950 | Bell et al. | 60/226 R |
|---|---|---|---|
| 2,594,118 | 4/1952 | Boyd | 60/39.09 D |
| 3,056,258 | 10/1962 | Marchant et al. | 60/226 |
| 3,172,253 | 3/1965 | Schelp et al. | 60/267 |
| 3,182,898 | 5/1965 | Hewson | 60/226 R |
| 3,477,231 | 11/1969 | Paulson | 415/119 |
| 3,542,152 | 11/1970 | Adamson et al. | 181/222 |
| 3,602,333 | 8/1971 | Kobayashi et al. | 415/119 |
| 3,750,689 | 8/1973 | Britt | 244/53 B |
| 3,867,813 | 2/1975 | Leibach | 60/226 R |
| 3,879,941 | 4/1975 | Sargisson | 137/15.1 |
| 3,937,238 | 2/1976 | Stewart et al. | 415/119 |
| 3,981,466 | 9/1976 | Shah | 60/39.09 D |

FOREIGN PATENT DOCUMENTS

| 619390 | 3/1949 | United Kingdom | 60/39.09 D |
| 637598 | 5/1950 | United Kingdom | 60/39.09 D |

*Primary Examiner*—Louis J. Casaregola
*Attorney, Agent, or Firm*—Christensen, O'Connor, Johnson & Kindness

[57] ABSTRACT

A noise-suppressing air inlet having two coaxially arranged airflow channels to supply inlet air to a gas turbine engine is disclosed. The outer airflow channel has an annular cross-sectional geometry and is formed between the inner wall of a tubular outer cowling which forms the forward portion of the engine housing and the outer wall of a tubular inner cowling that is coaxially mounted within the outer cowling. The inner airflow channel is formed between the inner wall of the inner cowling and a forward projecting central hub of the gas turbine engine. Major portions of the walls of both the inner and outer cowling include sound attenuating panels to suppress noise propagating in the forward direction through both airflow channels of the air inlet. The inner cowling is supported within the outer cowling such that the leading edge of the inner cowling projects forwardly of the outer cowling leading edge. This support is provided by a number of radially extending, circumferentially spaced-apart struts located between the inner wall of the outer cowling and the outer wall of the inner cowling. The struts are aerodynamically contoured and have a hollow interior for the passage of tubing of an aircraft thermal anti-icing system. The two airflow channels are of a height dimension which provides near optimal noise suppression, thus resulting in minimal air inlet length and minimum length to diameter ratio for a given sound suppression level. Minimizing the length to diameter ratio reduces the airload on the inlet structure during various aircraft maneuvers, reduces the overall weight of the air inlet and, since the outer surface area of the air inlet is thereby minimized, results in less drag.

6 Claims, 6 Drawing Figures

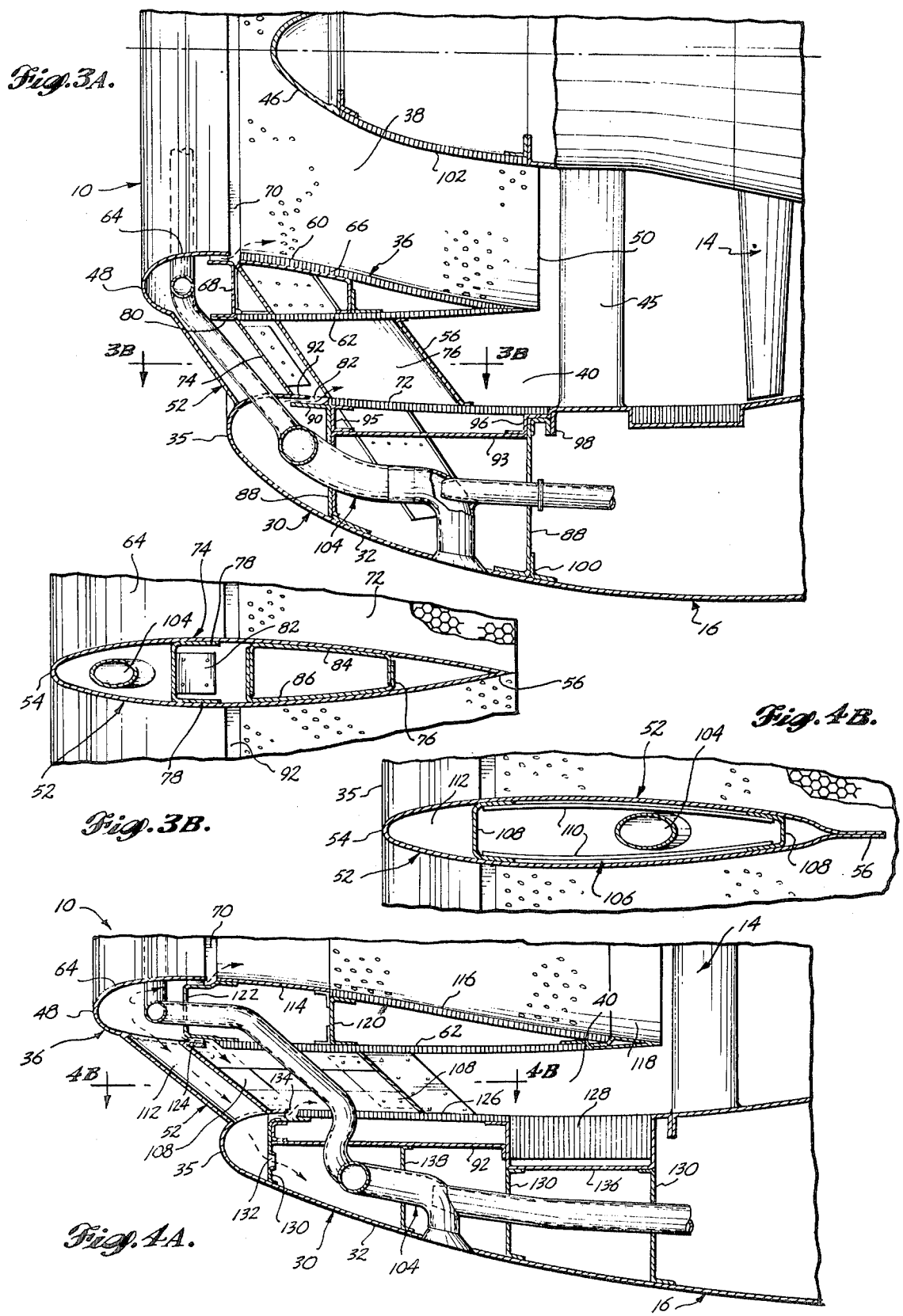

NOISE REDUCING AIR INLET FOR GAS TURBINE ENGINES

BACKGROUND OF THE INVENTION

This invention relates to gas turbine engines and, more particularly, to acoustically-treated inlet structure for supplying inlet air to a gas turbine engine while sumultaneously suppressing noise travelling outwardly through the air inlet.

It is known within the acoustic art that sound energy (e.g., noise) travelling through a duct or airflow channel can be attenuated or suppressed by acoustically absorptive lining materials mounted along the interior wall surfaces of the duct. Further, it is known that, when such acoustic treatment is applied to the duct walls, the acoustically treated area necessary to provide a given amount of sound suppression is directly proportional to the dimensions of the duct, e.g., duct height or diameter.

These acoustic principles have been applied in part to the gas turbine engine art in an attempt to suppress the noise generated by a gas turbine engine. For example, one component of gas turbine noise that is commonly called inlet noise is due to acoustic energy propagating in the forward direction through the air inlet duct of a gas turbine engine. Inlet noise is due to a number of sources including the engine compressor stage and the high speed rotation of the fan in a turbofan engine including fan blade tip vortices. Since forwardly propagating inlet noise constitutes a considerable portion of the overall noise level generated by a gas turbine engine, especially during the approach and landing maneuvers of jet aircraft employing such gas turbine engines, considerable effort has been devoted to the suppression of engine noise in the inlet structure. Since completely lining the air inlet wall area of a conventional gas turbine engine with sound suppressing liners does not generally provide adequate noise suppression, much of the prior art is directed to structural methods of increasing the available mounting area and/or decreasing the effective airflow channel dimensions within the inlet duct to thereby decrease the required amount of acoustically absorptive lining material.

One common approach to increasing the area available for mounting acoustically absorptive liners while simultaneously reducing the dimensions of at least a portion of the inlet duct is the use of one or more thin rings coaxially mounted within the air inlet. In most configurations in which more than one such ring is employed, the rings are concentrically mounted about the axial center line of the air inlet with acoustically absorptive material lining the surfaces of the rings. See, for example, "Progress of NASA Research Relating to Noise Alleviation of Large Subsonic Jet Aircraft," NASA Report SP-189, 1968, Paper #9, "Design Concepts," by Robert E. Pendley.

Although such rings effectively subdivide a portion of the air inlet into smaller airflow channels that are more amenable to low noise operation and provide a somewhat increased area for the mounting of acoustically absorptive lining material, such techniques have not reduced the inlet noise to a suitable level. Thus, as stricter governmental regulations on engine noise level have been imposed, it has become the practice in the art to provide longer inlet ducts to further increase the area available for the mounting of acoustically absorptive linings. In this respect, modern acoustically treated inlet ducts often have a length-to-diameter ratio on the order of 1 or more, whereas the air inlets of gas turbine engines employed prior to the present-day noise restrictions commonly had length-to-diameter ratios of approximately 0.6.

Increasing the length of the air inlet structure generally causes a detrimental increase in the weight of the air inlet. Further, relatively long inlet ducts are undesirable from an aerodynamic standpoint, since such relatively long air inlets are subjected to substantial airloads as the aircraft is operated. For example, since the air inlet is generally mounted to project forwardly from the front face of the engine, climbing maneuvers, such as experienced during aircraft take-off procedures, couple a substantial bending moment to the engine and to the structure upon which the engine is mounted. Thus, such relatively long, acoustically-treated inlets place further constraints on the structural design of the engine in that the engine and its mounting arrangement must be able to withstand the additional loading. Designing an air inlet to withstand this structural loading often results in a further increase in inlet weight. Additionally, it will be recognized that such relatively long air inlet structure may not be suitable for use in aircraft designs wherein the engine is mounted in close proximity with other aircraft structure. Accordingly, it can be said that, although the relatively long prior art acoustically inlets have provided improvement in noise performance, this improvement has introduced performance penalties and design constraints both in the design of gas turbine engines and in the design of aircraft employing such engines.

The structure of the rings used within such prior art inlets also present a number of disadvantages and drawbacks. First, to minimize the blockage of air flowing through the air inlet and to minimize the turbulence created by the rings, the rings generally have a rather thin cross-sectional geometry. This geometry creates problems in that such thin rings must be constructed of relatively heavy material such as steel in order to attain sufficient structural integrity. Further, it is difficult to prevent the formation of ice on such thin rings with conventional aircraft thermal anti-icing systems. Additionally, even when constructed of steel or other strong material, such rings are extremely vulnerable to the impact of foreign objects, such as birds, and often break under impact. When such breakage occurs, the ring fragments usually pass into the engine turbo-machinery to severely damage or destroy the engine. In addition to the above-noted drawbacks, the mounting of such rings within the air inlet tends to prevent visual inspection of the forward mounted engine components, such as the fan blades of a turbofan gas turbine engine.

There is yet another problem that relates to air inlets of both the acoustically-treated variety and those air inlets which are not equipped for noise suppression which occurs when strong cross-winds or wind shear are encountered. Under such conditions, air does not pass directly into and through the airflow channel of conventional air inlets and localized pressure disturbances are created throughout the aircraft engine. Such pressure disturbances detrimentally affect engine performance and can, under severe cross-wind conditions, cause at least momentary engine failure.

Accordingly, it is an object of this invention to provide a gas turbine engine air inlet having a relatively low length to diameter ratio which is configured for the suppression of inlet noise.

It is another object of this invention to provide a low noise, gas turbine engine air inlet wherein the weight and performance penalties normally attendant with such a low noise duct are minimized.

It is still another object of this invention to provide a gas turbine air inlet that is configured to increase the area available for the mounting of acoustically absorptive material while simultaneously decreasing the dimensions of the airflow channels within the air inlet to thereby provide an engine inlet wherein inlet noise can be efficiently suppressed by means of acoustic lining materials.

It is yet another object of this invention to provide a low noise, gas turbine air inlet compatible with conventional aircraft anti-icing systems.

Even further, it is an object of this invention to provide a noise suppressing air inlet having less obstruction to the visual inspection of the front face of a gas turbine engine utilized therewith.

A further object of the invention is to provide an acoustically-treated air inlet which inproves aircraft engine performance under cross-wind conditions.

SUMMARY OF THE INVENTION

These and other objects are achieved in accordance with this invention by a dual air inlet including a generally annular outer airflow channel that coaxially surrounds an inner airflow channel. The outer airflow channel is formed between the inner wall of an outer cowling that defines the forward portion of the engine housing and the outer wall of a generally tubular inner cowling that is coaxially mounted within the interior of the outer cowling. The inner airflow channel is formed between the inner wall of the centrally mounted inner cowling and a forward projecting central hub of the engine.

The inner cowling is supported within the outer cowling by a number of circumferentially spaced-apart struts that extend radially between the outer cowling inner wall and the inner cowling outer wall. Relative to the axial direction (i.e., the direction of airflow), the leading edge of the inner cowling projects forward beyond the outer cowling leading edge and the trailing edge of the inner cowling is located near the engine face, e.g. in a turbofan engine, adjacent the fan blades or inlet guide vanes.

In accordance with this invention, the outer and inner airflow channels are dimensioned and contoured to provide proper airflow to the engine (without choking the airflow) and simultaneously provide near optimal attenuation of the noise energy produced by components of the engine, such as the engine fan stage, and propagating through the air inlet in the forward direction. The noise is suppressed by sound attenuating material or panels mounted on the inner wall of the outer cowling and on both the inner and outer walls of the centrally mounted inner cowling. Preferably, the sound attenuating liners are sound suppressing panels that form a portion of the wall structure the inner and outer cowlings. In the practice of this invention, the height of the outer airflow channel is established in view of the frequency components of the noise to be suppressed and the noise generation characteristics of the engine upon which the air inlet is to be employed.

In comparison to prior art acoustically treated inlets, the air inlet of this invention provides a substantial increase in the area over which sound suppressing material can be mounted without the use of structure that interferes with airflow. Further, the air inlet of this invention enhances sound suppression by partitioning the entire air inlet length into separate airflow channels that are dimensioned to induce efficient sound suppression. Since air inlets embodied in accordance with this invention provide a satisfactory level of noise suppression with a lower length to diameter ratio than presently available low noise air inlets, the engine cowling structure can be substantially lighter in weight than prior art cowling structure. This reduced length to diameter ratio also results in an air inlet for any particular engine application in which the bending moment on the engine that is caused by pressure differences on the air inlet is reduced relative to a longer prior art air inlet. This decreased bending moment reduces the structural load requirements within the air inlet such that the air inlet of this invention can be constructed of lighter materials than those utilized in presently available air inlets. Further, the structural arrangement of this invention causes no sacrifice in performance, but in fact improves turbofan pressure recovery under cross-wind conditions.

In the preferred embodiments of the invention, the radially extending, circumferentially spaced-apart struts that support the airflow duct within the cowling have a hollow interior region. Tubing, for supplying pneumatic anti-icing from the aircraft thermal anti-icing system, is routed through the interior of the struts to prevent icing of the leading edge regions of both the cowling and the airflow duct.

BRIEF DESCRIPTION OF THE DRAWINGS

Other objects and advantages of the present invention will become apparent to one skilled in the art after a reading of the following description taken together with the accompanying drawing, in which:

FIG. 3A is a partial, cross-sectional view of an embodiment of this invention configured for operation with a low bypass ratio turbofan engine;

FIG. 3B is a cross-sectional view, taken along the line 3B—3B of FIG. 3A, depicting a support strut of the embodiment of FIG. 3A;

FIG. 4A is a partial, cross-sectional view of an embodiment of this invention configured for operation with a high bypass ratio turbofan engine; and, FIG. 4B is a cross-sectional view, taken along the line 4B—4B of FIG. 4A, depicting a support strut of the embodiment of FIG. 4A.

DETAILED DESCRIPTION

Figure 1:
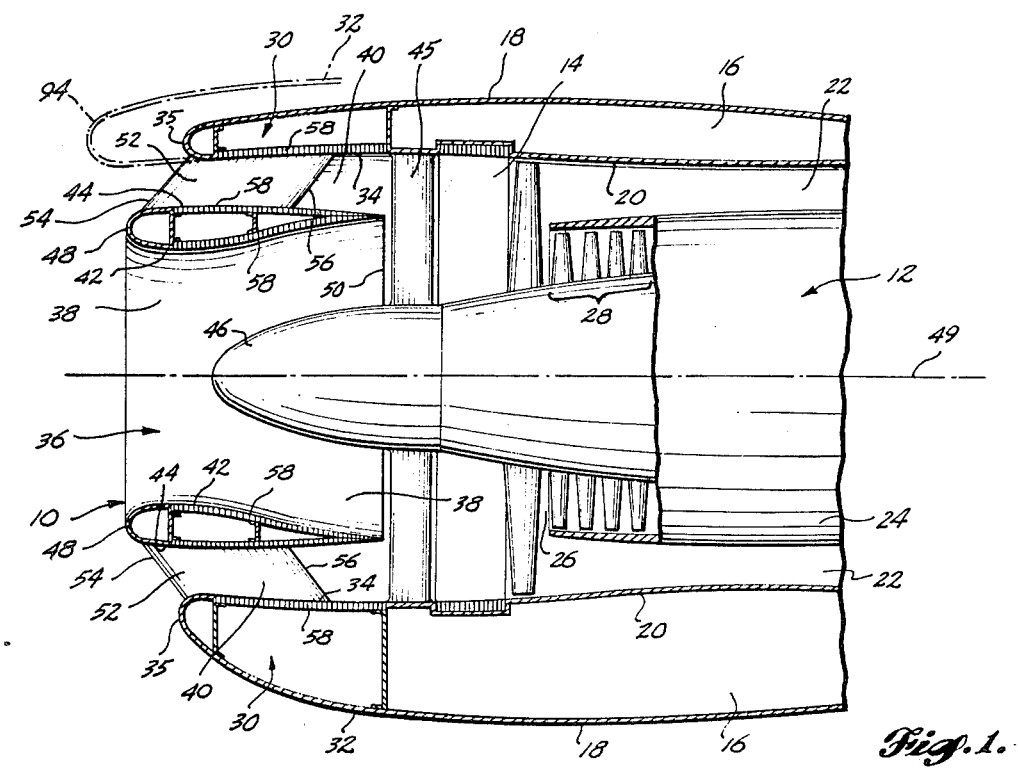
FIG. 1 is an axial cross-sectional view of a portion of a gas turbine engine including an air inlet constructed in accordance with this invention.

In FIG. 1, an air inlet 10, constructed in accordance with this invention is shown mounted on the front face of a gas turbine engine 12. Although the gas turbine engine 12 depicted in FIG. 1 is of the turbofan variety, it will be recognized upon understanding this invention that embodiments thereof may be utilized with various other types of gas turbine engines.

The forward portion of the engine 12 includes a fan assembly 14 which is enclosed within a generally tubular, axially extending fan housing or cowling 16 having an outer wall 18 and an inner wall 20. The fan assembly 14 is effectively a low pressure, axial compressor for compressing the air flowing rearwardly through the air inlet 10. A portion of the air passing from the fan assembly 14 passes rearwardly through an annular fan duct 22. The annular fan duct 22 is formed between the fan housing inner wall 20 and a generally cylindrical casing 24 that extends rearwardly to form a housing or shell about the engine 12. The remaining portion of the air passing from the fan assembly 14 flows through an annular opening 26, formed at the entrance of the casing 24, to an axial compressor 28 which is mounted within the forward portion of the casing 24.

The air inlet 10 of this invention includes a generally tubular inner cowling 36 that is coaxially supported within a generally tubular outer cowling 30 by a number of radially extending, circumferentially spaced-apart struts 52. In accordance with this invention, the inner cowling 36 projects forwardly of the forward terminus of the outer cowling 30 and extends rearwardly to a point near the forward face of the fan assembly 14 to divide the air inlet 10 into two separate, coaxially arranged airflow channels 38 and 40. Portions of the inner surface of the outer cowling 30 and both the inner and outer surfaces of the inner cowling 36 include sound attenuating liners or panels (generally denoted by the numeral 58 in FIG. 1) to suppress noise which propagates in a forward direction through each of the separate airflow channels 38 and 40. As shall be described in more detail hereinafter, the structural arrangement of the air inlet 10 of this invention results not only in an air inlet having substantial area available for the mounting of sound attenuating materials, but also results in an air inlet having a lower length to diameter ratio than present-day acoustically treated air inlets. As previously mentioned, such a reduced length to diameter ratio not only reduces the length of an air inlet configured for a particular gas turbine engine, but, because of reduced airload requirements, permits the use of relatively lightweight materials.

Turning now to FIG. 1 for a more detailed understanding of the invention, the outer cowling 30 is a generally tubular shell arranged to extend forwardly from the fan housing 16. More explicitly, the outer cowling 30 includes an outer wall 32 and an inner wall 34 that merge at the forward terminus of the air inlet 10 to form a lip-like annular leading edge 35. At the aft terminus of the outer cowling 30, the outer wall 32 and the inner wall 34 smoothly merge with the outer wall 18 and inner wall 20 of the fan housing 16 to form an aerodynamically contoured extension of the fan housing 16.

The generally tubular inner cowling 36 includes an inner wall 42 and an outer wall 44 that smoothly merge at the forward end of the inner cowling to form an annular leading edge 48. Relative to the axial direction of airflow, the inner wall 42 and the outer wall 44 converge over the length of the inner cowling 36 to form a relatively sharp trailing edge 50 which is positioned immediately forward of the forward face of the fan assembly 14, e.g., an inlet guide vane 45 in the engine depicted in FIG. 1. As shown in FIG. 1, the length of the inner cowling 36 is greater than the length of the outer cowling 30 such that the leading edge 48 of the inner cowling 36 is positioned forward of the outer cowling leading edge 35.

In view of this arrangement, it can be seen that the outer cowling 30 and the inner cowling 36 cooperate to form an inner flow channel 38 coaxially surrounded by an annular outer flow channel 40 with the inner and outer flow channels being separated from one another throughout the entire length of the air inlet 10. As shall be described in more detail hereinafter, the projection of the airflow duct 36 beyond the leading edge 35 of the cowling 30 tends to improve engine performance under strong cross-wind conditions.

The inner airflow channel 38 is defined between the inner wall 42 of airflow duct 36 and the outer surface of an engine hub fairing 46. The engine hub fairing 46 is a generally frustoconical or bullet shaped conventional component of the gas turbine engine 12 that is concentric with the axial centerline 49 of the engine 12 and projects into the aft portion of the inner cowling 36. Thus, inner airflow channel 38 has a generally circular or elliptical cross-sectional geometry at the annular leading edge 48 and smoothly transits to an annular cross-sectional geometry formed between the inner wall 42 of the inner cowling 36 and the exterior surface of the hub fairing 46. Since the inner wall 42 of the inner cowling 36 converges more rapidly than the outer wall 44, the cross-sectional area of the inner flow channel 38 at the leading edge 48 is generally less than the cross-sectional area of the inner air flow channel 38 at the trailing edge 50.

The outer airflow channel 40 has a generally annular cross-sectional geometry and is formed between the inner wall 34 of the outer cowling 30 and the outer wall 44 of the inner cowling 36. Generally, the inner wall 34 of the outer cowling 30 and the outer wall 44 of the inner cowling 36 are contoured such that the annular cross-sectional area of the outer airflow channel 40 is relatively constant throughout the length of the air inlet 10. It will be recognized however that in some embodiments of the invention it may be advantageous to control the cross-sectional area of the outer airflow channel 40 relative to the direction of airflow to control the velocity of the air passing through the outer airflow channel 40.

Figure 2:
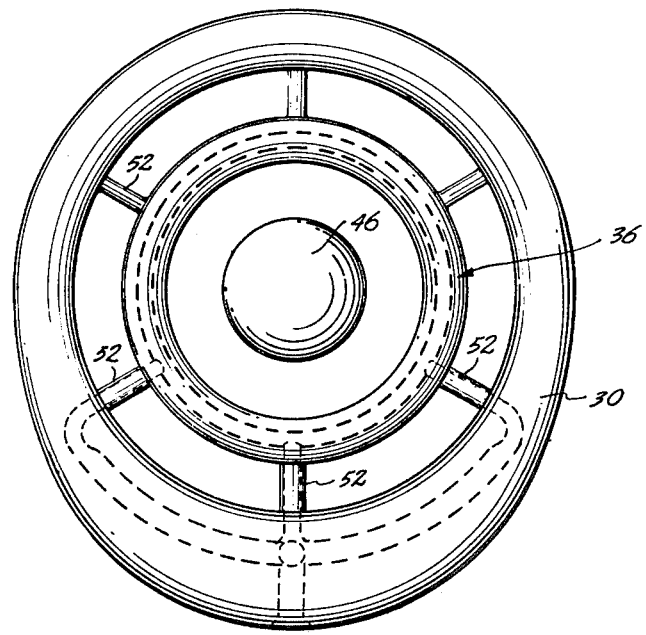
FIG. 2 is a view of the front face of an air inlet constructed in accordance with this invention.

Inner cowling 36 is supported within outer cowling 30 by a number of circumferentially spaced-apart struts 52 that extend radially between the outer wall 44 of the inner cowling 36 and the inner wall 34 of the outer cowling 30. The struts 52 are generally equally spaced from one another relative to the cross-sectional geometry of the air inlet 10 with six radial struts positioned at 60° intervals being shown in the embodiment of the invention depicted in FIG. 2. Each strut 52 has an aerodynamically contoured leading edge 54 extending radially from the annular leading edge 48 of the airflow duct 36 to the annular leading edge 35 of the cowling 30. Relative to the direction of airflow through the air inlet 10, the walls of the struts 52 first smoothly diverge and then smoothly converge to form a relatively sharp trailing edge 56. The strut trailing edge 56 is angularly disposed relative to the outer wall 44 of the inner cowling 36 and the inner wall 34 of the outer cowling 30 with the strut trailing edge 56 intersecting the outer cowling wall 34 at a position rearward of the intersection between the strut trailing edge 56 and the outer wall 44 of the inner cowling 36. As shall be discussed relative to the embodiments of the invention depicted in FIGS. 3 and 4, struts 52 can be interconnected with the cowling inner wall 34 and the airflow duct outer wall 44 by a variety of conventional techniques. Further, as indicated in FIG. 2, and as shall be discussed relative to the embodiments of FIGS. 3 and 4, the struts 52 are preferably hollow to accommodate the tubing of a thermal anti-icing system which supplies engine bleed air to maintain the inlet 10 at a temperature above the freezing point.

Turning now to the suppression of inlet noise, it should first be noted that the above-described structural arrangement of the air inlet 10 provides substantially more inlet surface area for the mounting of acoustically absorptive lining material than is provided by prior art air inlets having an identical length to diameter ratio. Accordingly, when acoustically absorptive liners are mounted on the inner and outer walls 42 and 44 of the inner cowling 36 and are mounted on the inner wall 34 of the outer cowling 30, the inlet noise passing outwardly from the forward end of the air inlet 10 is substantially decreased over the noise passing outwardly from prior art air inlets lined with acoustically absorptive material.

Secondly it should be noted that, as previously described, the structural arrangement of the air inlet 10 establishes a substantially continuous annular outer airflow channel 40 between the forward end of the air inlet 10 and the face of the fan assembly 14. In contrast, prior art air inlets equipped with rings to subdivide the airflow duct generally only divide portions of the inlet length into separate flow channels. Since the attenuation of sound waves travelling through an acoustically lined duct is inversely related to the height of the duct, the dual air inlet 10 not only provides increased noise suppression due to the increased area over which sound absorptive material can be mounted, but also increases noise suppression by dividing the inlet into two completely separate airflow channels over the entire air inlet length to attenuate the noise more efficiently than prior art inlets. Thus, in toto, an air inlet of this invention provides a required noise suppression level with a lower length to diameter ratio. Hence, superior noise suppression can generally be achieved without imposing undue design constraints on the aircraft or gas turbine engine and without appreciably increasing the weight of the overall propulsion unit. In this respect, for the purposes of comparison, the forward portion of the prior art accoustically treated inlet duct for achieving substantially the same degree of noise suppression is illustrated by phantom lines 94 in FIG. 1. Comparing the outline 94 of the prior art air inlet to the air inlet 10 of this invention, it can be seen that, not only is the conventional air inlet substantially longer than the air inlet 10, but the conventional air inlet necessarily has a greater cross-sectional geometry to withstand the previously described air loads associated with an inlet of such length.

In the operation of the invention, noise energy, radiated by the gas turbine engine 12, propagates in the forward direction through both inner airflow channel 38 and outer airflow channel 40. As the noise energy travels forward through the airflow channels 38 and 40, portions of the noise energy impinge on the surface of the engine hub fairing 46, the inner wall 34 of the outer cowling 30, and the inner and outer walls 42 and 44 of the inner cowling 36. In the practice of this invention, these wall surfaces are lined with a suitable conventional accoustically absorbent material, generally denoted by the numeral 58 in FIG. 1. As shall be described relative to the embodiments of the invention depicted in FIGS. 3 and 4, the major portion of the inner wall 34 of the cowling 30 and the walls 42 and 44 of the airflow duct 36 are preferably formed by acoustic panels that dissipate the energy of impinging sound.

In the practice of this invention, the height of the outer airflow channel 40 is dimensioned in view of the particular type of engine on which the invention is employed. Specifically, it has been found that, with respect to present-day turbofan engines, a major portion of the inlet noise originates within regions of the fan structure that are located radially outwardly of the axial centerline 49 of the engine 12 (e.g., near the blade tips of the fan assembly 14 of FIG. 1). Generally, the proper dimensioning of the airflow channel 40 can be determined by an analytical procedure known to those skilled in the acoustic arts wherein the noise generated by the engine 12 is modeled as an equivalent localized noise source having predetermined frequency characteristics. Once the location of this theoretical noise source relative to the engine geometry has been determined, outer airflow channel 40 can be suitably dimensioned to receive the major portion of the inlet noise. In this respect, it has been found that in a turbofan engine of the high bypass ratio variety, the equivalent noise source is located very near the extremities of the fan blades and very near the engine face. In contrast, it has been found that the equivalent noise source of a low bypass ratio turbofan engine is usually located further aft of the engine face due to the more rearward location of the fan blades. Accordingly, as illustrated in FIGS. 3 and 4, which respectively depict embodiments of the invention suitable for use with turbofan engines of the low bypass ratio and high bypass ratio variety, it is advantageous to increase the height dimension of the outer airflow channel 40 in embodiments employed with engines having a low bypass ratio over the height dimension utilized with engines having a high bypass ratio. Generally, with respect to either type of turbofan engine, it has been found that the height of the outer airflow channel 40 is generally in the range of 5 to 7 inches, with the optimum height dimension preferably being determined by the analytical methods described above and by further experimental techniques once a theoretical height dimension is established.

In addition to illustrating the variation in the height of outer airflow channel 40 for low bypass ratio and high bypass ratio engines, FIGS. 3 and 4 illustrate typical structural arrangements of the acoustic sound-suppressing panels within the air inlet of this invention and illustrate typical structural arrangements for interconnecting the inner cowling 36, the struts 52 and the outer cowling 30. Further, in conjunction with FIG. 2, FIGS. 3 and 4 illustrate thermal anti-icing of the air inlet 10 in accordance with this invention.

In each embodiment depicted in FIGS. 3 and 4, sound suppression is effected by acoustic panels which structurally form major portions of the air inlet walls, and dissipate the energy of impinging sound waves. Such acoustic panels are known in the art, with one example thereof being disclosed in U.S. Pat. No. 3,481,427, issued to Dobbs et al. Generally, such acoustic panels are rigid or semi-rigid structural members having a first surface including suitable openings through which impinging sound energy can pass and a second air impervious surface spaced apart from, and substantially parallel to, the first surface. The region between the two surfaces is generally divided into a plurality of small resonant chambers or cells such that noise energy entering through the openings of the first surface is dissipated as heat within the chambers.

Referring more particularly to FIG. 3A, a major portion of the boundary walls of the flow duct 36 are constructed of acoustic panels 60 and 62. The panels 60 and 62 are conical or cylindrical in shape and extend rearwardly from an annular ring 64 having a U-shaped cross-sectional geometry. The ring 64 is mounted such that the spaced-apart, substantially parallel boundaries thereof extend rearwardly substantially in parallel with the engine axial centerline 49. With this mounting arrangement, the closed surface interconnecting the spaced-apart boundary walls defines the leading edge 48 of the inner cowling 36. The rear portions of the panels 60 and 62 are tapered and joined together by conventional bounding techniques to form the relatively sharp trailing edge 50 of the inner cowling 36.

The forwardmost regions of the acoustic panels 60 and 62 are supported by an annular support ring 66 which is dimensioned to correspond to the interior spacing between the panels 60 and 62 over approximately one half of the axial span of the acoustic panels. Generally, the inner surfaces of the panels 60 and 62 are bonded to the surface of the annular support ring 66 by a conventional, resinous bonding agent. A U-shaped bracket 68 projects forwardly from the support ring 66 to interconnect the support ring 66 with the annular ring 64. As shown by the arrows of FIG. 3A, a small, annular slot 70 (or a series of small openings) is formed between the inner leg of the bracket 68 and the inner surface of the annular ring 64 to permit anti-icing air to flow outwardly from the interior region of the inner cowling 36.

In the embodiment of FIG. 3, each strut 52 is structured to support the inner cowling 36 within the outer cowling 30 and to provide for the passage of the thermal anti-icing tubes. More specifically, and as previously described, each strut 52 includes an aerodynamically shaped shell which extends radially between the outer wall of the inner cowling 36 (i.e., acoustic panel 62 in FIG. 3A) and the inner wall of the outer cowling 30 (i.e., an acoustic panel 72 in FIG. 3A). To support the spaced-apart walls of the strut and to provide for attachment of the strut to the inner cowling 36 and the outer cowling 30, each strut 52 includes a mounting bracket 74 and an inner strut 76. As is shown in FIG. 3B, the mounting bracket 74 is substantially U-shaped, having two flanges 78 that extend rearwardly along the inner surfaces of the strut 52. Viewed transversely (FIG. 3A), the mounting bracket 74 is positioned substantially parallel to the leading edge 54 of the strut 52. Flange 80, extending forwardly from the upper end of the mounting bracket 74, is connected to the annular ring 64. Flange 62, extending rearwardly from the lower end of the mounting bracket 74, is connected to the inner wall of the outer cowling 30. As can best be seen in FIG. 3B, the inner strut 76 is formed by two channel members 84 and 86, each of which has flanges along two oppositely disposed edges with the flanges of each channel 84 and 86 being substantially parallel to one another. The channels 84 and 86 are dimensioned to mate with one another, with a flange of each channel contiguous with a flange of the other channel. Thus, the inner strut 76 is effectively a hollow beam having a substantially trapezoidal cross-sectional geometry. In particular, the cross-sectional geometry of each inner strut 76 is arranged such that the outer surfaces of the inner strut conform to the curvature of the strut outer shell to thereby structurally strengthen the strut 52.

As can also be seen in FIG. 3A, the inner strut 76 is positioned substantially parallel to the strut leading edge 54 and the strut trailing edge 56, with the inner end of the inner strut 76 projecting inwardly into the interior of the inner cowling 36 through an appropriately sized opening. In a like manner, the outer end of the inner strut 76 projects outwardly into the interior region of the outer cowl 30. The portions of the inner strut 76 that project into the interior regions of the inner cowling 36 and the outer cowling 30 are connected to internal support members (not shown in FIG. 3) to securely mount the airflow duct 36 within the cowling 30.

To acoustically line the boundary wall of the outer airflow channel 40, a substantially cylindrical acoustic panel 72 forms a major portion of the outer cowling inner wall. As shown in FIG. 3A, the outer cowling 30 includes a series of internal support panels arranged to structurally strengthen the outer cowling 30 and to support the acoustic panel 72 substantially flush with the remaining region of the outer wall of the airflow channel 40. In the depicted arrangement, annular webs 88 extend radially between the outer surface of the acoustic panel 72 and the inner surface of the outer wall 32 of the outer cowling 30. The inner and outer edges of the webs 88 include flanges or small, angular brackets that extend along the cowling walls for connecting the webs to the outer cowling 30. As shown in FIG. 3A, a forwardly projecting flange 90 is positioned along the forwardmost web 88 and spaced-apart from the wall of the outer cowling 30 to form an annular groove 92 for the outward passage of thermal anti-icing air.

A thin, substantially cylindrical panel 98 extends axially between the annular webs 88 in spaced-apart relationship with the acoustic panel 72. An annular ring 95 having a U-shaped cross-sectional geometry, interconnects the forwardmost annular web 88 with the cylindrical panel 93 and the acoustical panel 72. The rearmost annular web 88 is attached to the cylindrical panel 93 and the acoustic panel 72 by an annular flange 96 of substantially Z-shaped cross-section, having one leg thereof extending along the surface of each of the three interconnected components. Additionally, an annular bracket 98 and a bracket 100 are respectively mounted on the inner and outer edges of the rearmost annular web 99 for mounting the air inlet 10 to the fan housing 16.

As shown in FIG. 3A, in embodiments wherein the engine hub fairing 46 does not rotate, an acoustic panel 102 can be used to form a major portion of the hub fairing. Since such an acoustic panel provides sound attenuation along the second boundary wall of the inner airflow duct 38, suppression of fan noise is thereby enhanced.

To provide thermal anti-icing to the outer cowling annular leading edge 35 and the inner cowling leading edge 48, anti-icing tubing 104, which is connected to the aircraft pneumatic anti-icing system, passes longitudinally through the lower interior of the outer cowling 30. Appropriately sized openings formed in the annular webs 88 permit passage of the anti-icing tubing 104. After passing through the forwardmost annular web 88, the anti-icing tubing 104 is formed to pass inwardly through a passage formed between the outer shell of the strut 52 and the mounting bracket 74. Referring to FIG. 2, the anti-icing tubing 104 is routed circumferentially through the interior of the outer cowling 30, passing radially inward through a number of struts 52 and then circumferentially around the interior region of the annular leading edge 48 of the inner cowling 36. In the embodiment of FIG. 2, the anti-icing tubing passes inwardly through three struts 52 that are located below the axial centerline of the inner cowling 36 and then passes completely around the interior of the annular leading edge 48.

The tubing 104 includes a substantial number of small openings that introduce pressurized, warm air into the interior of the outer cowling 30 and the interior of the inner cowling 36. As denoted by the small arrows in FIG. 3, this warm air flows through the interior of the outer cowling 30 and the inner cowling 36 to maintain the leading edges 35 and 48 of the outer cowling 30 and inner cowling 36 above the freezing point. As previously described, a number of small holes or slots are generally provided to permit the warm air to escape through the walls of the cowling 30 and the airflow duct 36, for example, the previously-described openings 70 and 92. Additionally, if desired or necessary, the interior structure of the outer cowling 30 such as the annular webs 88 can include a series of small openings for the diffusion of the anti-icing air throughout outer cowling 30.

As previously noted, the embodiment depicted in FIGS. 4A and 4B is arranged to dimension the outer flow duct 40 for operation with a high bypass ratio turbofan engine wherein the acoustically equivalent noise source is generally located very near the blade tips of the fan assembly 14. Additionally, the embodiment of FIG. 4 illustrates several structural variations which can be included in the practice of this invention. For example, in the embodiment of FIG. 4, the thermal anti-icing tubing 104 is routed through the central region of the struts 52 rather than along the strut leading edge region. To accommodate this routing, each strut 52 includes an inner strut 106 which includes two U-shaped channels 108 and two plates 110. In this arrangement, one channel 108 is positioned near the strut leading edge 54 and the second channel 108 is positioned near the strut trailing edge 56 with each of the channels being substantially parallel to the strut leading and trailing edges. The spaced-apart, substantially parallel legs of each channel 108 extend along the surface of the outer shell of the strut 52 with the plates 110 extending between legs of the channels 108 such that the inner strut 106 is effectively a hollow, beam-like member.

As can be seen in FIG. 4, the forwardmost channel 108 cooperates with the outer shell of the strut 52 to form an air passage 112 which extends between the leading edge region of the airflow duct 36 and the leading edge region of the cowling 30. As illustrated by the arrows of FIG. 4A, thermal anti-icing air, discharged within the interior of the inner cowling 36 by the anti-icing tubing 104, circulates outwardly through the air passage 112 and into the interior region of the outer cowling 30. As previously described, this anti-icing air flows into the inner and outer flow ducts 38 and 40 through small openings or annular slots (e.g., slot 70).

FIGS. 4A and 4B further illustrate an alternative arrangement for the inner cowling 36. In particular, in the embodiment of FIG. 4, a substantially cylindrical metal shell 114 extends rearwardly from the inner boundary of the annular ring 64 that forms the inner cowling leading edge 38, with a substantially cylindrical acoustic panel 116 extending between the aft edge of the shell 114 and an annular trailing edge ring 118. As in the case of the arrangement of FIG. 3, the outer walls of the inner cowling 36 are formed by a substantially cylindrical acoustic panel 62. The annular trailing edge 118 is constructed of metal and is formed to include flanges along the forward edges thereof for receiving and retaining the aft terminus of the acoustic panels 116 and 62. An annular spacer 120, mounted to extend radially between the inner surface of the acoustic panels 62 and the juncture of the cylindrical shell 114 with the forward edge of the acoustic panel 116, interconnects these three components and supports the acoustic panel 116 along its forwardmost edge. The spaced-apart legs of a mounting bracket 122, having a substantially U-shaped cross-sectional geometry extend rearwardly to join the rear boundary of the annular ring 64 to the cylindrical shell 114 and the acoustic panel 62. To permit anti-icing air to flow from the interior of the annular ring 64, an annular slot or series of openings 70 is formed between the forward edge of the cylindrical shell 114 and the aft edge of the annular ring 64 and a slot or series of grooves 124 is formed between the forward edge of the acoustic panel 62 and the aft edge of the annular ring 64.

As is further illustrated in FIG. 4A, the outer cowling 30 can be arranged for the mounting of two separate acoustic panels. More explicitly, in the embodiment of FIG. 4, a first substantially cylindrical panel 126 and a second substantially cylindrical panel 128 are serially mounted between the aft terminus of the outer cowling leading edge 35 and the aft terminus of the air inlet 10. The acoustic panel 128 is of greater thickness than the panel 126 and has the internal cavities or cells thereof sized for the attenuation of lower frequency sound energy than the cavities of the panel 126. Such an arrangement is especially advantageous when the invention is employed with turbofan gas turbine engines having a high bypass ratio, since such engines often do not include sound suppression of low frequency noise components commonly termed "buzz saw" noise that is associated with operation of the engine fan stage 14.

To support the acoustic panels 126 and 128, the outer cowling 30 includes three annular webs 130 similar in structure to the annular webs 88 of FIG. 3. The webs 130 extend radially in substantial alignment with the boundary edges of the acoustic panels 126 and 128. The forwardmost web 130 includes a number of openings 132 to permit anti-icing air to flow from the leading edge region 35 into the remaining interior region of the outer cowling 30. Additionally, the upper end of the forwardmost annular web 130 is mounted to the inner wall of the outer cowling 30 to form an annular slot or series of openings 134 which permits anti-icing air to pass from the outer cowling leading edge region into the outer flow duct 40. As in the embodiment of FIG. 3, a cylindrical shell 92 spans the intervening region between the two annular webs 130 that support the acoustic panel 126 and a substantially cylindrical shell 136 spans the intervening region between the two annular webs 130 that support the acoustic panel 128. A substantially annular support ring 138 extends radially between the central region of the shell 92 and the cowling outer wall 32 for additional support.

As previously described in FIG. 1, an outline of a typical, conventional, air inlet dimensioned to supply an amount of air substantially identical to the depicted air inlet 10 is shown by phantom lines 94. Comparing the outline of the conventional air inlet to the air inlet 10, it can be noted that, although air inlet 10 provides superior noise performance, the length to diameter ratio of this invention is less than the length to diameter ratio of the conventional inlet. As previously described, a lower length to diameter ratio can be important in situations in which a noise reducing inlet is required, but a longer inlet is impractical because of the structural configuration of the aircraft. The decreased length to diameter ratio of the invention also permits embodiments of the invention having a weight comparable to prior art acoustically treated air inlets even though the present invention includes a greater volume of sound absorptive material and an inner duct structure such as the inner cowling 36. This result is achievable since the reduced length to diameter ratio of an air inlet structured in accordance with this invention results in less bending moment due to air pressure differential between the upper and lower surfaces of the inlet. That is, as an aircraft maneuvers through the atmosphere, the air pressure on the lower surface of the engine housing and air inlet can be substantially different from the air pressure on the upper surface. This pressure differential creates bending moments between the various structural components, e.g., a bending moment of the complete engine assembly about the engine support structure and a bending moment of the air inlet 10 about the fan housing 16. In embodiments of this invention configured for use with a particular aircraft, it has been found that the air inlet 10 reduces the bending moment of the inlet about the fan housing by more than 50% relative to prior art acoustically treated inlets having a greater length to diameter ratio. Thus it can be understood that the cross-sectional area of the cowling 30 can be considerable less than the cross-sectional area of the cowling of prior art inlets without compromising structural design goals. By way of example, in the above-referred to embodiments, the reduced length to diameter ratio resulted in an outer cowling approximately one-half as heavy as a conventional air inlet cowling. Thus, although the inlet 10 includes additional structure in struts 52 and inner cowling 36 and additional weight due to the increased amount of sound absorptive material, the overall weight of the air inlet 10 is less than or at least comparable to prior art acoustically treated air inlets.

It has also been determined that the practice of this invention does not impose appreciable engine performance penalties. In particular, when the contours of the inner airflow channel 38 and the outer airflow channel 40 are established to effect the required airflow velocities and volume of airflow, the air inlet 10 performs as satisfactorily as prior art air inlets. It has been found, in fact, that under certain conditions an air inlet structured in accordance with this invention provides turbofan pressure recovery ratios superior to prior art inlets. More specifically, one problem in the prior art has been maintaining an adequate pressure recovery ratio under severe cross wind or wind shear conditions. Under such conditions, air does not flow directly into the conventional air inlet duct and rather turbulent conditions are created within the air inlet causing a temporary loss of engine performance and possible stalling of the engine compressor stage. In air inlet 10 however, the forwardly projecting annular leading edge 48 of the inner cowling 36 and the two separate airflow channels 38 and 40 tend to restore such airflow to a less turbulent condition as air passes through the air inlet 10.

It will be recognized by those skilled in the art that the depicted embodiments of the invention are exemplary in nature and that variations therein can be made without exceeding the scope and the spirit of this invention. For example, many variations are possible in the structural arrangement of the struts and the interior support members of the cowling. Further, although the air inlet is depicted as a separate assembly fastened to the forward end of a gas turbine engine, the air inlet can be constructed as an integral part of the engine, e.g., as a portion of the fan housing 16.

What is claimed is:

1. A noise suppressing air inlet for use in combination with a gas turbine engine that is encased in a housing and includes a compressor stage, said air inlet comprising:

a generally tubular outer cowling for forming a forward end of said engine housing and having an annular leading edge, said outer cowling having an inner wall and an outer wall with said inner wall defining an airflow duct for directing airflow to said compressor stage, at least a portion of said inner wall a sound absorbing surface;

a generally tubular inner cowling having an annular leading edge, an inner wall and an outer wall, said inner cowling coaxially mounted at a fixed position within said outer cowling, said inner cowling having an annular leading edge positioned forwardly of said annular leading edge of said outer cowling, at least a portion of said inner and outer walls of said inner cowling having a sound absorbing surface, said inner cowling partitioning said airflow duct into an inner airflow channel defined by said inner wall of said inner cowling and an annular outer airflow channel defined between said outer wall of said inner cowling and said inner wall of said outer cowling, said inner and outer airflow channels extending substantially over the entire axial length of said air inlet; and, a plurality of struts for mounting said inner cowling within said outer cowling, said struts being circumferentially spaced apart from one another and extending radially from said outer wall of said inner cowling to said inner wall of said outer cowling.

2. The noise suppressing air inlet of claim 1 wherein said sound absorbing surfaces of said outer and inner cowlings each comprises at least one sound absorbent panel.

3. The noise suppressing air inlet of claim 1 wherein said struts include a hollow interior region and said air inlet further comprises tubing for supplying pneumatic anti-icing to said cowling and said duct, said tubing routed through the interior region defined between said outer cowling inner and outer walls, through said hollow interior region of at least one of said struts and through the interior region of said inner cowling formed between said inner and outer walls of said inner cowling.

4. In an aircraft gas turbine engine having an airflow channel within a generally tubular engine cowling for supplying ambient air to said gas turbine engine, said engine cowling being mounted to extend forwardly from said gas turbine engine, said airflow channel being defined by an inner wall of said engine cowling which extends in spaced apart relationship with an outer wall of said engine cowling, said inner and outer walls of said engine cowling being interconnected to define an annular leading edge wherein predetermined regions of said engine cowling inner wall include sound absorbent regions, the improvement comprising:

a generally tubular inner cowling having an annular leading edge and spaced apart inner and outer walls which extend rearwardly from said annular leading edge of said inner cowling and converge with one another to form a relatively sharp trailing edge, said inner cowling being mounted coaxially within said airflow channel of said engine cowling to divide substantially the entire length of said airflow channel into an annular outer airflow channel defined between said outer wall of said inner cowling and said inner wall of said engine cowling and an inner airflow channel defined by said inner wall of said inner cowling, said inner cowling having a length dimension sufficient to position said annular leading edge of said inner cowling forwardly of said annular leading edge of said engine cowling, said inner and outer walls of said inner cowling each including sound absorbent regions, said inner cowling being dimensioned to establish the height of said inner and outer airflow channels for propagation of a major portion of forwardly propagating engine noise through said outer airflow channel; and a plurality of struts circumferentially spaced apart from one another and extending radially between said inner cowling and said engine cowling for securely mounting said inner cowling in said airflow channel of said engine cowling.

5. The improvement of claim 4, wherein each of said sound absorbing regions of said inner and outer walls of said inner cowling comprise acoustic panels defining at least a portion of said inner and outer walls of said inner cowling.

6. The improvement of claim 4, wherein said struts include an open interior region extending radially between said engine cowling and said inner cowling, said improvement further comprising pneumatic anti-icing tubing routed through the interior region of said engine cowling defined between said inner and outer walls of said engine cowling, said anti-icing tubing extending circumferentially about at least a portion of said engine cowling and extending radially inward through at least one of said open interior regions of said struts, said anti-icing tubing further extending circumferentially around said annular leading edge of said inner cowling, said anti-icing tubing connectable to a thermal anti-icing system for maintaining said engine cowling and said inner cowling above the freezing point.

* * * * *

UNITED STATES PATENT AND TRADEMARK OFFICE
CERTIFICATE OF CORRECTION

PATENT NO. : 4,240,250
DATED : December 23, 1980
INVENTOR(S) : Alfred W. Harris

It is certified that error appears in the above-identified patent and that said Letters Patent are hereby corrected as shown below:

Column 1, line 62: the comma after "techniques" is deleted.

Column 3, line 23: "inproves" is changed to --improves--.

Column 7, line 42: "accoustically" is changed to --acoustically--.
    Column 7, line 62: "accoustically" is changed to --acoustically--.

Column 14, line 16: --having-- is inserted after "wall".
    Column 14, line 40: "comprises" is changed to --comprise--.

Signed and Sealed this

Twenty-sixth Day of May 1981

[SEAL]

*Attest:*

RENE D. TEGTMEYER

*Attesting Officer*    *Acting Commissioner of Patents and Trademarks*